United States Patent Office 3,334,315
Patented Aug. 1, 1967

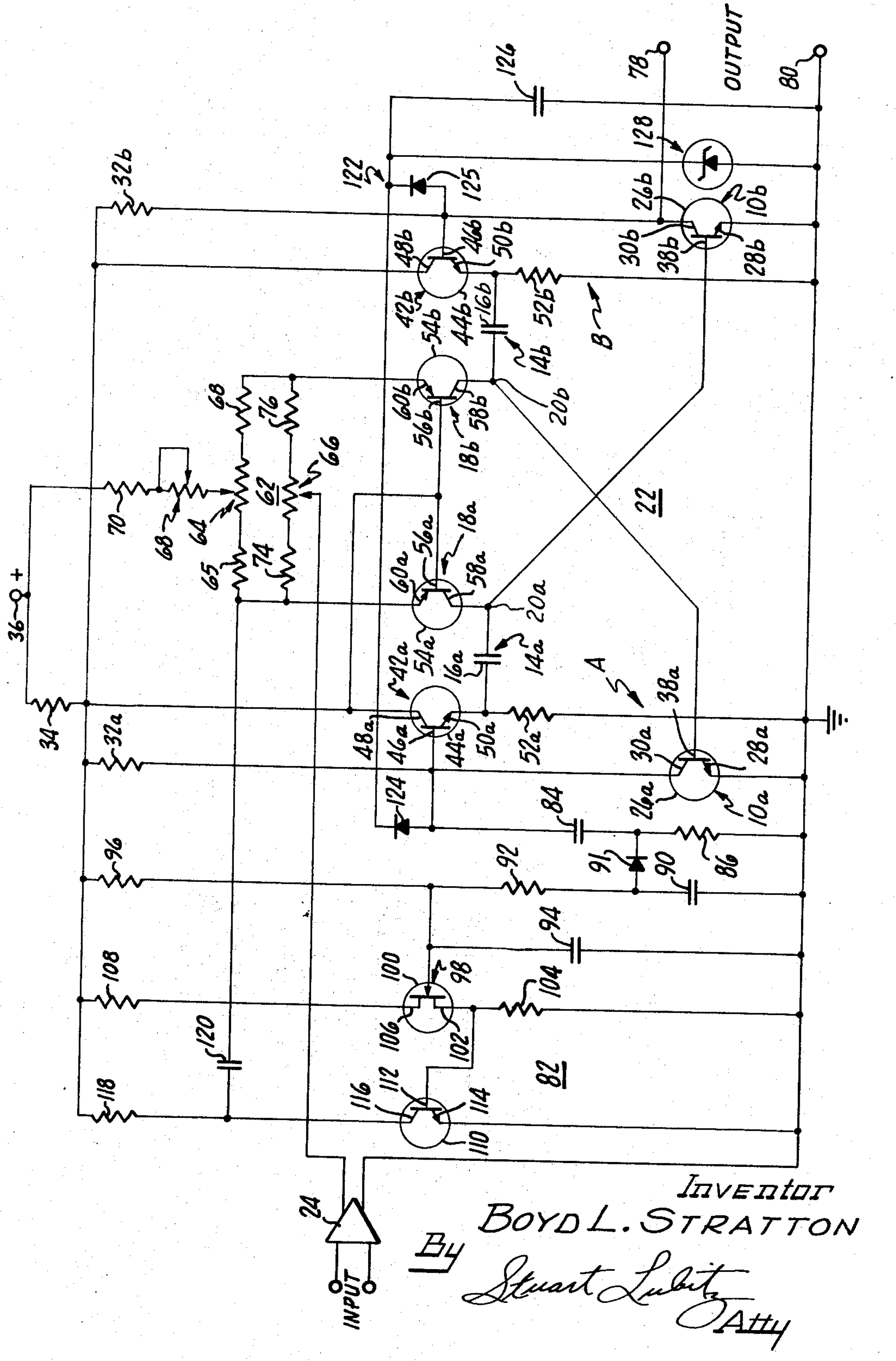
Inventor
BOYD L. STRATTON
By Stuart Lubitz
Atty

3,334,315
TRANSISTORIZED MULTIVIBRATOR MODULATOR WITH STARTING CIRCUIT

Boyd L. Stratton, Woodside, Calif., assignor to Ampex Corporation, Redwood City, Calif., a corporation of California Filed Nov. 29, 1963, Ser. No. 326,926
2 Claims. (Cl. 332—14)

The present invention relates generally to frequency modulators and more particularly to a wide band frequency modulation device, which incorporates a multivibrator.

The process of modulation in general involves producing a composite waveform, some characteristic of which varies in accordance with the instantaneous value of the input signal wave, called the modulating wave. In frequency modulation or FM, the instantaneous frequency of the signal to be modulated, which is ordinarily referred to as the carrier wave, is caused to depart from its initial frequency by an amount proportional to the instantaneous value of the modulating signal.

Television or other wide band tape recording systems normally employ a frequency modulated system to record the video signal on a magnetic tape. In the frequency modulation system, the modulating signal (i.e., the video or other wide band signal) either directly modulates a multivibrator operating at the carrier frequency or modulates a high frequency oscillator which is then heterodyned to provide the signal to be recorded. The carrier frequency is slightly higher than the maximum frequency of the video or other wide band signal, and the ratio of the change or deviation of the carrier corresponding to the maximum modulating frequency is such that the information transmitted by the frequency modulated signal is effectively contained in the carrier frequency component and the first upper and lower side band components.

The direct modulation system using a freely oscillating multivibrator is simpler than the heterodyne modulation system, but it is subject to certain problems. In this connection, a multivibrator tends to be unstable, and/or nonlinear, when the frequency thereof is varied over a wide range. More important, since the frequency of the multivibrator is just above the highest modulating frequency there is a tendency for the higher frequencies of the modulating signal to feed-through the multivibrator and combine with the frequency modulated signal, thereby causing pattern interference.

Heterodyne type modulators permit partial control of the feed-through of the modulating signal, but are subject to frequency drift, harmonic distortion, and intermodulation effects.

It is an object of the present invention to provide a multivibrator type modulator in which feed-through of the modulating signal into the frequency modulated output is eliminated. Another object of the invention is to provide a multivibrator type modulator having substantially reduced harmonic distortion and intermodulation effects. Another object of the present invention is to provide a multivibrator type modulator having a substantially increased linearity and high frequency response. A further object is the provision of a multivibrator type modulator, which is simple to operate, highly stable and reliable, and economical to manufacture and maintain.

Further objects and advantages of the invention will become apparent by reference to the following description and accompanying drawing, wherein the sole figure is a schematic circuit diagram of a preferred embodiment of a wide band multivibrator type modulator.

Generally, the disclosed modulator includes a free-running multivibrator, the frequency of which is varied in accordance with an input signal. The modulator includes a pair of amplifying means 10*a* and 10*b*, each of which has a substantially conducting state of operation and a substantially non-conducting state of operation. The amplifying means 10*a* and 10*b* are cross coupled by means 14*a* and 14*b* including capacitors 16*a* and 16*b*. A pair of constant current sources 18*a* and 18*b* are respectively coupled to the junction 20*a* and 20*b* of the capacitors and the associated inputs of the amplifying means 10*a* and 10*b* to thereby provide a free-running multivibrator 22 which oscillates at a frequency dependent upon the current provided by the sources 18*a* and 18*b*. An input or modulating signal is coupled to both current sources 18*a* and 18*b* to vary the currents supplied by the sources 18*a* and 18*b* in accordance with the modulating signal.

More specifically, in the embodiment of the invention shown in the accompanying drawing, the input or modulating signal, which is a video or other wide band signal, is amplified by a suitable video amplifier 24 which preferably includes pre-emphasizing circuitry for providing pre-emphasis. The output of the video amplifier 24, which is a direct current signal, varying in accordance with the input video signal, is coupled to the free-running multivibrator 22 so as to vary the frequency thereof. In this connection, as more fully explained hereinafter, the frequency of the multivibrator 22 is controlled by varying the charging current supplied to the cross coupling capacitors 16*a* and 16*b* in accordance with the output of the video amplifier 24.

The illustrated free-running multivibrator 22 comprises two similar cross-coupled circuits A and B (i.e., the output of each circuit is coupled to the input of the other circuit). For purposes of description, the parts of the left hand circuit A in the drawing (hereinafter referred to as the "left hand circuit") are indicated with the reference numeral and the subscript "*a*." Corresponding parts in the other circuit B, the right hand circuit in the drawing (hereinafter referred to as the "right hand circuit") are indicated with the same reference numeral and the subscript "*b*."

Each circuit includes the amplifying means 10*a*, 10*b* which in the illustrated embodiment is an n-p-n transistor 26*a*, 26*b* coupled in a grounded emitter configuration. Each amplifying transistor 26*a*, 26*b* is biased so as to operate either in a substantially non-conducting or a substantially conducting state. In this connection, the emitter 28*a*, 28*b* is grounded and the collector 30*a*, 30*b* is coupled through a load resistor 32*a*, 32*b* and an isolation resistor 34 to a positive voltage source (not shown) at terminal 36. The base 38*a*, of the amplifying transistor 26*a*, is coupled to the output of the cross coupling means 14*b* of the right hand circuit *b*, while the base 38*b* of the amplifying transistor 26*b* is coupled to the output of the cross coupling means 14*a* of the right hand circuit A.

In the illustrated embodiment, each cross coupling means 14*a*, 14*b* includes the capacitor 16*a*, 16*b*, one end of which is connected to the base 38*b*, 38*a* of the amplifying transistor 26*b*, 26*a* of the opposite circuit, and an isolating means 42*a*, 42*b* coupled between the collector 30*a*, 30*b* of the amplifying transistor 26*a*, 26*b* and the other end of the capacitor 16*a*, 16*b*. By isolating the output of the amplifying means 10*a*, 10*b* from the capacitor 16*a*, 16*b*, a faster rise and fall time is provided on the output signal. The illustrated isolating means 42*a*, 42*b* is an n-p-n transistor 44*a*, 44*b* coupled in a common collector configuration, sometimes called an emitter follower. In this connection, the collector 30*a*, 30*b* of the amplifying transistor 26*a*, 26*b* is directly connected to the base 46*a*, 46*b* of the isolating transistor 44*a*, 44*b*, the collector 48*a*, 48*b* of the isolating transistor 44*a*, 44*b* is connected through the isolating resistor 34 to the positive voltage terminal 36, and the emitter 50*a*, 50*b* is coupled through a load resistor 52*a*, 52*b* to ground. The other end of the capacitor 16*a*, 16*b* is connected to the junction between the load resistor 52*a*, 52*b* and the emitter 50*a*, 50*b*.

The frequency of the oscillation of the free-running multivibrator 22 depends upon the time it takes for the base to emitter voltage of the amplifying transistor 26*a* or 26*b*, which is in its non-conducting state of operation, to reach its switching voltage. The attainment of this voltage depends on the rate of build-up of charge on the respective cross coupling capacitors 16*b* and 16*a*. In order to provide linear operation of the multivibrator 22 over very large swings in deviation, the capacitors 16*a* and 16*b* are respectively charged from the constant current sources 18*a* and 18*b*.

In the illustrated embodiment, each constant current source 18*a*, 18*b* includes a p-n-p transistor 54*a*, 54*b* connected in a common base configuration. In this connection, the base 56*a*, 56*b* is connected through the isolating resistor 34 to the positive voltage terminal 36, and the collector 58*a*, 58*b* is connected to the junction between the capacitor 16*a*, 16*b* and the base 38*b*, 38*a* of the amplifying transistors 26*b*, 26*a*. The currents supplied by the constant current transistors 54*a* and 54*b* to the capacitors 16*a* and 16*b*, respectively, are controlled by connecting the emitters 60*a* and 60*b* through a common balancing and adjusting network 62 to the positive voltage supply.

The balancing and adjusting network 62 includes means a potentiometer 64, or equivalent means, for balancing the rate of build-up of charge or the current to the cross coupling capacitors 16*a*, 16*b*, means a potentiometer 66, or equivalent means for balancing the modulation of the current to the capacitors 16*a*, 16*b* by the modulating signal, and means 68 for adjusting the center or carrier frequency of the modulator 22. The center frequency adjusting means 68 includes a rheostat connected in series with both of the emitters 60*a* and 60*b* of the constant current transistors 54*a* and 54*b*, between the emitters 60*a* and 60*b* and the positive voltage terminal 36. The adjustment of the means 68 will set the free-running frequency of the multivibrator.

The opposite ends of potentiometer 64 are connected respectively through series resistors 65 and 68 to the emitters 60*a* and 60*b* of the constant current transistors 54*a* and 54*b*. The tap of potentiometer 64 is connected to one end of the rheostat 68. By properly adjusting the potentiometer 64, the second harmonic component of the instantaneous carrier wave may be substantially reduced and substantially perfect carrier waveform symmetry may be provided. A temperature sensitive resistor 70 is connected in series with the frequency control rheostat 68 in order to reduce the effects of ambient temperature on the carrier frequency.

The potentiometer 66 is provided with a tap which is coupled to the output of the video amplifier 24. The ends of the potentiometer 66 are connected respectively through series resistors 74 and 76 to the emitters 60*a* and 60*b* of the constant current transistors 54*a* and 54*b*. By adjusting the potentiometer 66 to a position such that the base currents of the amplifying transistors 26*a* and 26*b* are equally modulated, distortion and spurious output of the demodulated FM signal are reduced to a minimum.

In the illustrated embodiment, the output of the multivibrator 22 is provided at output terminals 78 and 80 connected respectively to the collector 30*b* of the right hand amplifying transistor 26*b* and to ground. Alternately, the frequency modulated output may be taken from the collectors 30*a* and 30*b* of both amplifying transistors 26*a* and 26*b* through a transformer (not shown).

In order to ensure starting of the multivibrator 22, a suitable starting circuit 82 is provided in the modulator. In the illustrated starting circuit 82, the signal produced at the collector 30*a* of the left hand amplifying transistor 26*a* is employed to show whether or not the multivibrator 22 is oscillating. In the absence of this signal, the starting circuit 82, which is a non-sinusoidal, or relaxation oscillator, is fired or turned on. The starting circuit 82 is connected so as to cut off the left hand constant current transistor 54*a*, thereby unbalancing the multivibrator 22. The signal on the collector 30*a* of left hand amplifying transistor 26*a* is detected by coupling the same through a capacitor 84 to a load resistor 86. A storage capacitor 90 is charged to the negative peaks of the signal developed across the resistor 86 by coupling the signal developed across the resistor 86 through a diode 91 to the storage capacitor 90. The negative voltage developed across the capacitor 90 is coupled through a resistor 92 to a firing capacitor 94 which is thereby maintained at a voltage below the firing potential of the starting circuit 82. The firing capacitor 94 is charged to the firing potential, in the absence of a signal on the collector, by coupling the positive voltage terminal 36 through the isolating resistor 34 and a resistor 96 to the firing capacitor 94.

The starting circuit 82 includes an unijunction transistor 98, the base 100 of which is coupled to the junction between the firing capacitor 94 and the resistor 96. Base-one 102 of the unijunction transistor 98 is coupled through a resistor 104 to ground. Base-two 106 of the unijunction transistor 98 is coupled through a resistor 108 and the isolating resistor 34 to the positive voltage terminal 36. The firing of the unijunction transistor 98 turns on an n-p-n transistor 110, which is normally biased in a non-conductive state. The transistor 110 is coupled in a common emitter configuration, the base 112 thereof being coupled to the base-one 102 of the unijunction transistor 98, the emitter 114 thereof being grounded, and the collector 116 thereof being coupled through a load resistor 118 and the isolating resistor 34 to the positive voltage terminal 36.

When transistor 110 is turned on, a negative pulse of current appears at its collector 116. This negative pulse is coupled to the emitter 60*a* of the left hand constant current transistor 54*a* through a capacitor 120, causing the left hand constant current transistor 54*a* to be turned off for the duration of the negative pulse. When the constant current transistor 54 is turned off, base current to the right hand amplifying transistor 26*b* is correspondingly cut off, which momentarily unbalances the multivibrator 22, and causes oscillation of the multivibrator 22 to start. The oscillation of multivibrator 22 results in a signal appearing at the collector 30*a* of the left hand amplifying transistor 26*a* which turns off the starting circuit 82.

In normal operation of the illustrated modulator, the maximum modulating frequency approaches the carrier frequency. Hence, the higher modulating frequencies feed through the multivibrator 22 to the output (video feed-through) appearing as amplitude modulation of the FM output signal, unless provision is made for eliminating the same. In the illustrated embodiment, the video feed-through is eliminated by a limiting circuit 122 which eliminates the amplitude modulation at the collectors 30 of the amplifying transistors 26*a* and 26*b* and hence the video feed-through. The limiting circuit 122 includes a pair of forward biased diodes 124 and 125, connected respectively to the collectors 30*a* and 30*b* of the amplifying transistors 26*a* and 26*b*. The other ends of the diodes 124 and 125 are connected to ground through a capacitor 126. Thus, the collector voltage of each of amplifying transistors 26*a* and 26*b* appears across the capacitor 126. The maximum voltage appearing across the capacitor 126 is limited by the breakdown of a breakdown or Zener diode 128 connected in parallel with the capacitor 126. Thus, the breakdown voltage of the Zener diode 128 is selected so that any amplitude modulation is eliminated from the output FM signal. It should be understood that the circuit configuration itself minimizes feed-through and the limiting circuit 122 only further perfects the superior circuit feed-through performance.

From the foregoing, it can be seen that a modulator is provided in which video feed-through is eliminated, distribution and intermodulation is reduced, and modulator linearity is increased.

Various changes and modifications may be made in the above described modulator without departing from the spirit or scope of the present invention.

Various features of the invention are set forth in the attached claims.

What is claimed is:

1. A wide band multivibrator type modulator, which is particularly adapted for use in a wide band tape recording system, said modulator comprising two similar circuits, each circuit including an input terminal, an output terminal, a capacitor, one end of which is coupled to said input terminal, a current amplifying means having an input coupled to the other end of said capacitor and having a substantially non-conducting state of operation and a substantially conducting state of operation, a source of constant current coupled to the input of said amplifying means, isolating means coupling the output of said amplifying means to said output terminal, the output terminal of each circuit being coupled to the input terminal of the other circuit to thereby provide a multivibrator oscillating at a frequency dependent upon the currents provided by said sources, a voltage limiting means coupled to the output of each of said current amplifying means for limiting the maximum voltage of said output, starting means having a predetermined threshold at an input thereof above which a signal is produced at an output thereof, said starting means including storage means coupled to said input thereof to maintain a potential thereat below said threshold in the presence of charge stored in said storage means, said starting means including means coupled between one of said amplifying means and said storage means to apply charge thereto in response to periodic time variations in a signal of said one amplifying means, said starting means including means establishing a potential at the input thereof in excess of said threshold in the absence of charge stored in said storage means, said starting means including means coupling the output thereof to one of the constant current sources to reduce the current thereof in response to a signal at the output of said starting means, and means coupled to said current sources for varying the current supplied by each of said sources in accordance with an input signal.

2. A wide band multivibrator modulator, which is particularly adapted for use in a video tape recorder system, said multivibrator modulator comprising a pair of first transistors each connected in a common emitter configuration and being biased to operate either in a substantially conducting or a substantially non-conducting state, a pair of second transistors each connected in a common collector configuration, the collectors of said first transistors being respectively coupled to the bases of said second transistor, a pair of capacitors cross coupled between the emitters of said second transistors and the bases of said first transistors, a pair of third transistors connected in a common base configuration, the collectors of said third transistors being respectively coupled to the junction between said capacitors and associated bases of said first transistors, means connected to the emitters of said third transistors for biasing the same so that equal base currents flow to said first transistors, means connected to said biasing means for varying the same in accordance with an input signal, a limiting circuit including a pair of forward biased diodes connected respectively to the collectors of said first transistors, a capacitor connecting said diodes to the emitters of said first transistors, and a breakdown diode connected in parallel with said capacitor, and a starting circuit having an input responsive to a variable signal on the collector of one of the first transistors, and an output connected to the emitter of one of said third transistors.

References Cited

UNITED STATES PATENTS

| | | | |
|---|---|---|---|
| 2,838,675 | 6/1958 | Wanlass | 331—113 |
| 2,846,583 | 8/1958 | Goldfischer et al. | 331—145 X |
| 2,997,665 | 8/1961 | Sylvan | 331—113 |
| 3,152,306 | 10/1964 | Cooper et al. | 332—14 X |
| 3,167,725 | 1/1965 | Derks | 331—113 |
| 3,167,726 | 1/1965 | Foerster | 332—14 X |
| 3,204,200 | 8/1965 | White | 331—113 X |

ROY LAKE, *Primary Examiner.*

A. L. BRODY, *Assistant Examiner.*